United States Patent [19]

Edstrom et al.

[11] 3,713,108

[45] Jan. 23, 1973

[54] BRANCH CONTROL FOR A DIGITAL MACHINE

[75] Inventors: Gene H. Edstrom; John W. Irwin, both of Longmont, Colo.

[73] Assignee: International Business Machines Corporation, Armonk, N.Y.

[22] Filed: March 25, 1971

[21] Appl. No.: 127,895

[52] U.S. Cl. ....................................................340/172.5
[51] Int. Cl. ....................................................G06f 9/20
[58] Field of Search ....................................................340/172.5

[56] References Cited

UNITED STATES PATENTS

| | | | |
|---|---|---|---|
| 3,445,818 | 5/1969 | Yen | 340/172.5 |
| 3,048,332 | 8/1962 | Brooks | 340/172.5 |
| 3,341,824 | 9/1967 | Wissick | 340/172.5 |
| 3,344,403 | 9/1967 | Foulger | 340/172.5 |
| 3,431,558 | 3/1969 | Capozzi | 340/172.5 |
| 3,391,394 | 7/1968 | Ottaway | 340/172.5 |
| 3,553,653 | 1/1971 | Krock | 340/172.5 |
| 3,351,909 | 11/1967 | Hummel | 340/172.5 |
| 3,374,466 | 3/1968 | Hanf | 340/172.5 |
| 3,559,183 | 1/1971 | Sussenguth | 340/172.5 |
| 3,573,854 | 4/1971 | Watson | 340/172.5 |

*Primary Examiner*—Paul J. Henon
*Assistant Examiner*—Sydney R. Chirlin
*Attorney*—Hanifin & Jancin and Herbert F. Somermeyer

[57] ABSTRACT

A program control for a machine operating with a set of instruction words having an operation code field with first and second control fields. The first control field is usually used for branch control, while the second control field has an alternate address for fetching the next instruction word within a given sized memory zone. Branch control means are responsive to predetermined ones of said operation code and first control field permutations for selecting a branch on condition (BOC). Most BOC's are limited to branching within the zone of memory from which the present instruction was fetched. Other BOC instructions use the condition on which a branch is to be based to modify the address from which the next instruction is fetched such that other zones of memory may be reached by a BOC. In other branch instructions, moving the program of instructions from one memory zone to another memory zone requires an unconditional branch.

24 Claims, 7 Drawing Figures

BRANCH CONTROL FOR A DIGITAL MACHINE

BACKGROUND OF THE INVENTION

The present invention relates to digital processing systems and more particularly to a digital processing system usable as an I/O system for a central processing unit.

In the wide applications of data processing systems, the peripheral subsystems have an increasingly important role in the data processing operation. As a result of this increasingly important role, the I/O controllers associated with the various peripheral devices have become more flexible, more complex, and generally more programmable. The I/O controllers generally have a read only store (ROS) and are considered as microprogrammable. As such, many of the functions performed in central processing units (CPU's) are now being performed in similar manners in the various I/O controllers. For example, many of the so-called "-housekeeping" programming functions are performed in both the CPU and in the I/O controller. These include branch operations, maintaining track of the location or where the present and previous instruction word was fetched from the control memory, among many others.

One of the main costs in any digital machine is the cost of the memory. For this reason, it is desirable in many applications to have a shorter control word or instruction word. This selection reduces the size of the memory and hence, the cost of the machine. On the other hand, in order to improve programming efficiency, there is a compromise in that the flexibility of the branching operation should be as great as possible. These two conflicting requirements are often difficult to resolve. In some machines, a branch on condition (BOC) instruction is limited to branching within a predetermined zone of memory. That is, the modulus of an address field of an instruction word is less than the number of bits required to completely address a specific register in memory. In such systems, the zone of memory is held in a register which is changeable by an unconditional branch operation combining two or more fields in the instruction or control word to generate a complete address. In other systems, a second word is used to carry the address.

The memory from which the instruction words are fetched (control memory) may have from two to eight or more zones of memory. To move from one zone of memory to another within the program of instructions an unconditional branch operation is required. For example, in an instruction word consisting of an operation code, a first field, and a second field, the first field may have a number of digits indicating the conditions on which branching will be effected, while the second field will be the address from which the next instruction word will be fetched if the condition is met. Otherwise, the next instruction will be fetched in accordance with another predetermined sequence of instruction words.

SUMMARY OF THE INVENTION

It is an object of the present invention to provide an improved branching control for a programmable digital machine.

A programmable digital machine employing the principles of the present invention includes a set of instruction words having at least an operation code field together with first and second control fields. The first control field includes, among other things, indications of the conditions on which the machine is to branch. The second control field contains an alternate address for obtaining the next instruction word within a zone of memory. Two types of branch on condition instructions are provided. On the first type, the branch control means is responsive to the first field for selecting a branch on condition. The second field indicates the memory address within that zone from which the present instruction was fetched from which the next instruction will be fetched. A second type of branching instruction includes an indication by the first control field of the condition on which the branch is to be made and to which zone of memory the next instruction will be obtained. The complete address of the next instruction word is based upon the first field combined with the code permutation in the second control field, viz the condition on which the branch is made.

Another aspect of the present invention is the manufacture of I/O controllers. The I/O controller is designed to have a basic set of instructions and programs for operating a peripheral system. Features to a peripheral system may be added either at the factory or out in the field. When added in the field, the programs associated with the added feature are designed to be located in a given zone of memory. Branch on condition instructions of the second type are added to the basic program of instructions such that the programmable machine can branch its programming to the added zone of memory. Alternatively, the second type of branch on condition instructions may be embedded in the basic machine programs. Then, when the feature is added, the machine will automatically branch to those programs in the added zone of memory.

The foregoing and other objects, features, and advantages of the invention will be apparent from the following more particular description of preferred embodiments of the invention, as illustrated in the accompanying drawings.

DETAILED DESCRIPTION

Referring more particularly to the drawings, like numerals indicate like parts of structural features in the various drawings.

PROGRAM ARRANGEMENT

Figure 1:
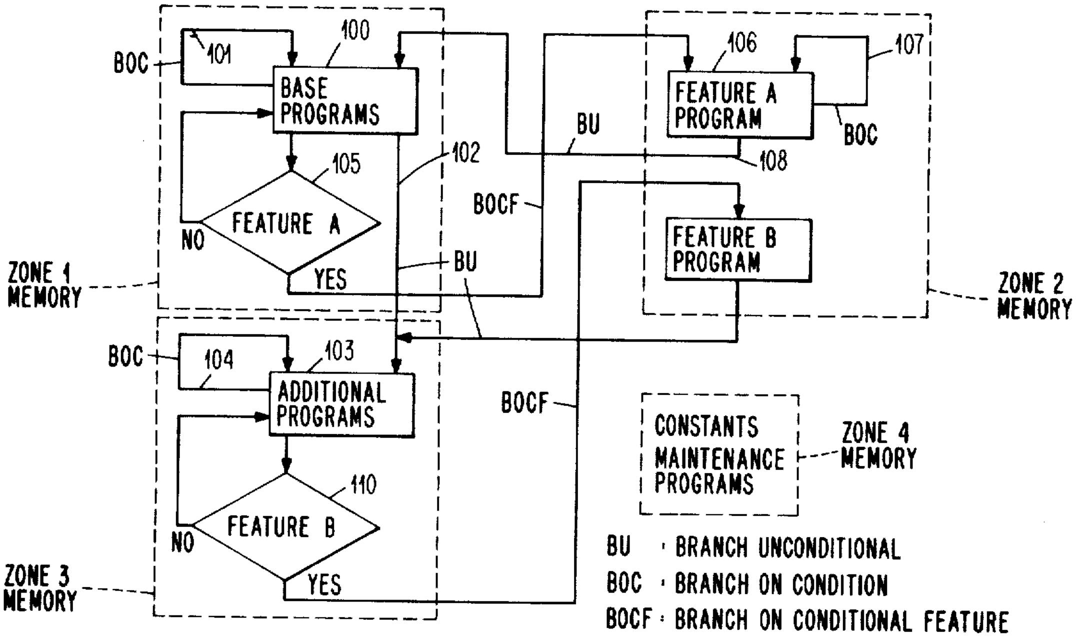
FIG. 1 is an abbreviated diagrammatic showing of the function of the present invention within a programmable machine.

The invention is best understood by first referring to FIG. 1 which is a simplified diagrammatic showing of a control memory arrangement with routing between various programs resident in such memory. The memory has zones 1–4, no limitation thereto intended. Zone 1 memory contains a set of base programs 100 which include branch on condition (BOC) instructions for branching the programs between various streams or sequences of instruction words resident in that zone and indicated by BOC line 101. To branch from zone 1 to zone 2 resident programs, a branch unconditional (BU) is effected such that branching follows line 102 to zone 2 resident additional programs 103. Within programs 103, various branch on condition instructions branch the program between the various streams of instructions as indicated by BOC line 104.

According to the present invention, a second type of branch on condition instruction is provided in the base and additional programs 100 and 103. This is termed "-branch on conditional feature" (BOCF). An instruction within base program 100 executes a branch decision 105 to determine whether or not hardware feature A is installed in the machine. If it is not installed, the program returns to the base programs 100. If it is installed, the addressing portion of the instruction word is modified such that branching between zones of memory is enabled without using a BU instruction. In the FIG. 1 illustration, when feature A is installed in the machine, the program automatically branches to zone 2 of the memory into feature A programs 106. Within feature A programs 106, the first type of branch on condition instruction may be utilized to reach different streams of instruction words as indicated by BOC line 107. Feature A programs exit via branch unconditional (BU) instruction over line 108 returning to base programs 100 or to other programs. Base programs 100 may refer to various portions of the feature A programs, but always through the utilization of the second type of branch on condition instruction. This latter instruction uses the condition on which the branch is made to select the zone of memory (zone 2) to which the branch is to be made. The normally used instruction address carried with the BOC instruction word designates which register in the condition-selected zone of memory is to be accessed for fetching the next instruction word.

Zone 4 of memory may be used to store constants, maintenance programs and the like. The set of programs can be lodged in any programmable machine. For purposes of illustration, a microprogrammable I/O controller in a tape subsystem is used to illustrate an application of the present invention.

GENERAL DESCRIPTION OF TAPE SUBSYSTEM (TSS)

Figure 3:
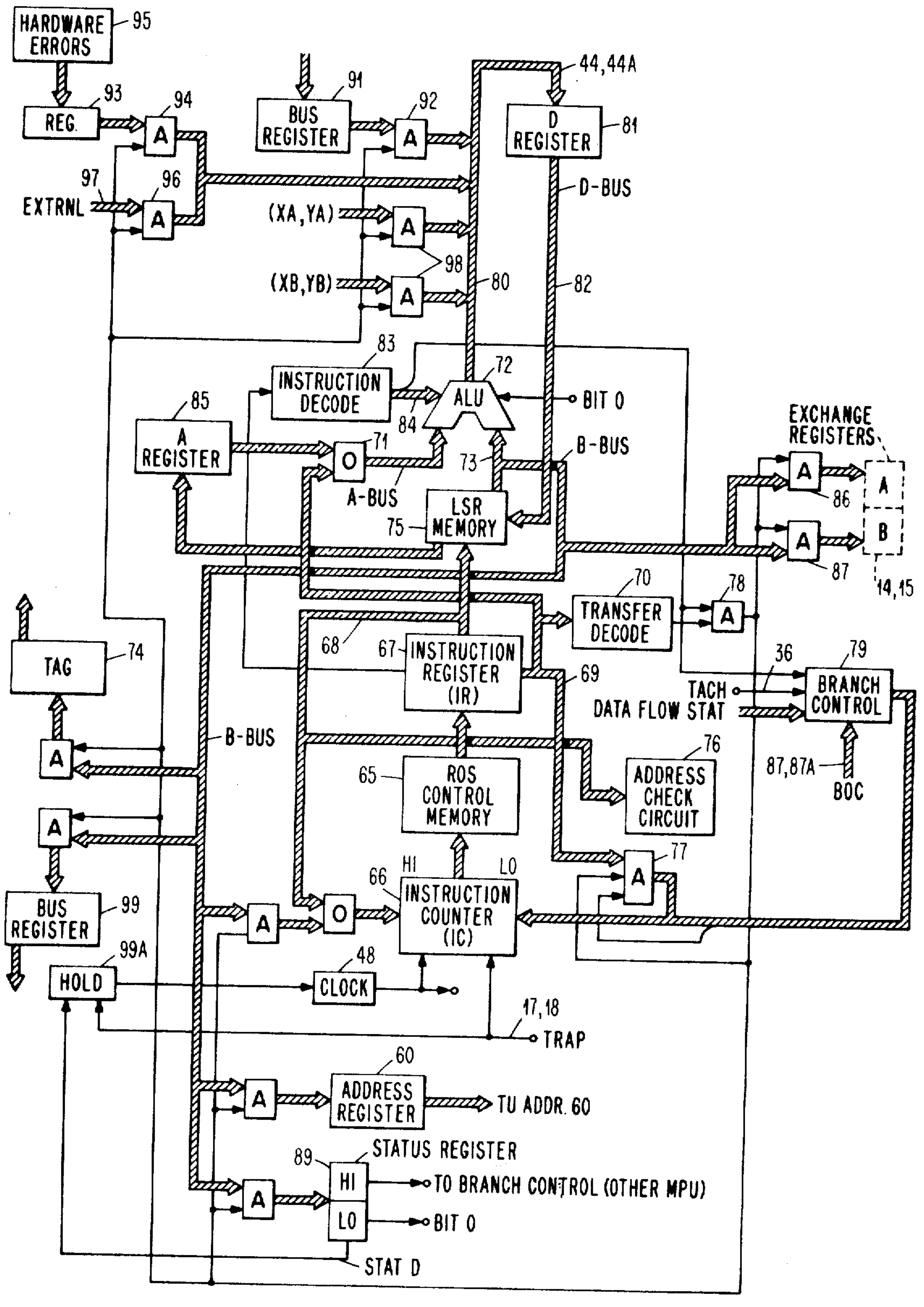
FIG. 3 is a simplified block diagram of an I/O controller utilizing the present invention.

The described I/O controller is particularly useful with the type of channel described in the Moyer et al. U.S. Pat. No. 3,303,476 and Beausoleil U.S. Pat. No. 3,336,582 for control via the Moyer et al. patented channel apparatus. The description assumes a channel I/O controller interface usable with a channel of the type described in those patents. FIGS. 1 and 3 of the Moyer et al. patent describe all tag signals used herein except SUPPRESSIBLE REQUEST IN which is defined with respect to MPUX (channel MPU) microprograms. It also assumes that the interface between the controller and the I/O devices follows a similar bus-out, bus-in, tag line arrangement. In addition to the functions described in the Moyer et al. patent, a tachometer input line is provided to I/O controller 11, as later described. Information handling system (IHS) interface X (INTFX) is the interface described in the Moyer et al. patent.

INTFX communicates with a CPU via cable 10. I/O controller 11 provides control for exchanging information-bearing signals between INTFX and INTFY. INTFY is connected to one or more magnetic media devices via cable 12. Such I/O devices, for purposes of illustration only, are magnetic tape units capable of recording and reproducing information-bearing signals, inter alia, in phase-encoding (PE) and NRZI schemes.

I/O controller 11 has three main sections. MPUX is a microprogrammable unit providing synchronization and control functions between the I/O controller and INTFX. MPUY performs similar functions with INTFY. In a magnetic type subsystem, MPUY provides motion control and other operational related functions uniquely associated with the described I/O device. The third section is data flow circuits 13, which actually process information-bearing signals between interfaces X and Y. Data flow circuits 13 may consist of entirely a hardware set of sequences and circuits for performing information-bearing signal exchange operations. In an I/O controller associated with a magnetic tape recording system, such data flow circuits include writing circuits for both PE and NRZI, readback circuits for both encoding schemes, deskewing operations, certain diagnostic functions and some logging operations associated with operating a magnetic tape subsystem.

Since MPUX and MPUY are independently operable, each having its own programs of micro-instructions, program synchronization and coordination is required. To this end, exchange register networks are provided. Each MPUY has its own output exchange registers, for example, MPUX has exchange registers 14 while MPUY has exchange registers 15. These registers receive output signals from the respective MPU's. The signals temporarily stored in these registers are supplied directly to data flow circuits 13 for effecting and supervising data flow and signal processing operations. This arrangement makes the data flow circuits 13 subservient to both MPUX and MPUY. Additionally, such signals are simultaneously provided to the other MPU—that is, register 15 supplies MPUY output signals to MPUX and register 14 supplies the MPUX output signals to MPUY. The respective MPU's under microprogram control selectively receive such signals for program coordination.

INTFX is a controlling interface. It not only exchanges control signals with MPUX over cable 16, but also has trap control line 17. When this line is actuated, MPUX aborts all present operations and branches to a fixed address for analyzing signals on cable 16. These signals simultaneously supplied over cable 16 force MPUX to perform INTFX selected functions. In a similar manner, MPUX has trap control line 18 extending to MPUY. MPUY responds to an actuating signal on line 18 from MPUX in the same manner that MPUX responds to a trap signal on line 17. MPUY, in addition to exchanging control signals over cable 20, with devices via INTFY, also has a trap line 21 for controlling an I/O device in a similar manner. All information-bearing signals are exchanged between interfaces X and Y through data flow circuits 13 via full-duplex cables 23 and 24.

Data flow circuits 13 have channel bus in (CBI) lines 30 and channel bus out (CBO) lines 31. Each set of lines has a capability of transferring 1 byte of data plus parity. Similarly, tape unit bus in (TUBI) lines 32 transfer signals to data flow circuits 13 and MPUY over INTFY. Tape unit bus out (TUBO) lines 33 carry information-bearing signals for recording in MTU's plus commands from MPUY and MTU addresses from MPUX. Status signals are supplied both to MPUX and MPUY over status cables 34 and 35. Velocity or tachometer signals supplied by the selected and actuated MTU are received over line 36 by MPUX, MPUY, and data flow circuits 13.

MPUX has output bus 40 (also termed B bus) supplying signals to its exchange registers 14. These include branch control register 41, register XA, and register XB. Output bus 40 is also connected to the channel exchanging registers 42. These registers are CTI and CBI. CBI is channel bus in, while CTI is channel tag in. CTI transfers the tag signals from I/O controller 11 to CPU as described in the Moyer et al patent and other control signals for interface operations.

Additionally, channel bus out (CBO) gate 43 receives bytes of data from INTFX for data flow circuits 13 and for MPUX. Gates XA and XB similarly gate exchange signals from the MPUY exchange registers 15. Gate XA receives the control signals from register YA while gate XB receives exchange signals from register YB. CBI register is shared by MPUX and data flow circuits 13. The CBI lines over INTFX are multiplexed in accordance with the Moyer et al. patent. CTI supplies tags indicating what the bus in signals mean.

INTFY operates in an identical manner. Signals in TUBO (tape unit bus out) register output lines 33 are interpreted by the MTU's in accordance with the signals in TUTAG (tape unit tag) register.

External signals are supplied to MPUX and MPUY via external registers 50 and 51, respectively. Such external signals may be from another I/O controller, from a maintenance panel, communication network, and the like. Also, hardware detected errors are lodged in register 52 for sampling by MPUX.

I/O controller 11 has an efficient initial selection process. MPUX responds to INTFX request for service of an MTU to provide the MTU address over output line 40 into TU address register 60. INTFY transfers the TU address to all MTU's. The appropriately addressed MTU responds to MPUY that the selection is permissable or not permissable. If permissable, a connection is made; MPUY notifies MPUX via register YA. MPUX then completes the initial selection by responding to INTFX via CTI. Data processing operations then can ensue. A detailed description of this initial selection procedure is included for clearly showing the relationships between MPUX, MPUY, data flow circuits 13, and the two interfaces X and Y.

MICROPROGRAMMABLE UNITS (MPU'S)

The MPU's contain microprograms which determine the logic of operation of I/O controller 11. MPUX contains a set of microprograms in its control memory designed to provide responsiveness and data transfers with INTFX. In a similar manner, MPUY contains a set of microprograms for operation through INTFY with the various MTU's. Registers 14 and 15 contain signals from the respective microprograms which serve as inputs to the respective programs for coordinating and synchronizing execution of various functions being performed. A better understanding of how the microprograms operate the hardware is attained by first understanding the logic construction of the MPU's which, in the illustrative embodiment, are constructed in an identical manner.

Referring more particularly to FIG. 3, an MPU usable in I/O controller 11 is described in a simplified block diagram form. The microprograms are contained in read only store (ROS) control memory 65. While a writable store could be used, for cost-reduction purposes, it is desired to use a ROS type of memory. The construction and accessing of such memories are well known. The ROS output signal word, which is the instruction word, is located by the contents of instruction counter (IC) 66. IC 66 may be incremented or decremented for each cycle of operation of MPU. By inserting a new set of numbers in IC 66, an instruction branch operation is effected. The instruction word from ROS 65 is supplied to instruction register (IR) 67 which staticizes the signals for about one cycle of operation. The staticized signals are supplied over cables 68 and 69 to various units in MPU. Cable 68 carries signals representative of control portions of the instruction word, such as the operation code and the like. Signals in cable 68 are supplied to IC 66 for effecting branching and instruction address modifications. Cable 69, on the other hand, carries signals representative of data addresses. These are supplied to transfer decode circuits 70 which respond to the signals for controlling various transfer gates within MPU. The other portions of the signals are supplied through OR circuit 71 to ALU 72. In ALU 72, such signals may be merged or arithmetically combined with signals received over B bus 73 for indexing or other data processing operations. MPU has local store register memory (LSR) 75 accessible in accordance with the address signals carried over cable 68. Address check circuit 76 verifies parity in the address. The address signals may also be used in branch operations. AND circuits 77 are responsive to transfer decode signals supplied from circuits 70 through AND circuits 78 to transfer the address signals in an instruction word to IC 66. Such transfer may be under direct control of the operation portion of the instruction word as determined by transfer decode circuits 70 or may be a branch on condition (BOC) as determined by branch control circuits 79 which selectively open AND circuits 77 in accordance with the conditions supplied thereto, as will become apparent.

The data flow and arithmetic processing properties of the MPU center around ALU 72. ALU 72 has two inputs—the A bus from OR circuit 71 and B bus 73. ALU 72 supplies output signals over cable 80 to D register 81. D register 81 supplies staticized signals over D bus 82 to LSR 75. Instruction decode circuits 83 receive operation codes from IR 67 and supply decoded control signals over cable 84 to ALU 72 and to AND circuit 78 for selectively transferring signals within MPU.

ALU 72 has a limited repertoire of operations. Instruction decode 83 decodes four bits from the instruction word to provide 16 possible operations. These operations are set forth in the Instruction Word List below:

INSTRUCTION WORD LIST

| Op Code | Mnemonic | Function |
|---|---|---|
| O | STO | Store Constant in LSR, A set to O |
| 1 | STOH | Store Constant in LSR, Indexed Addressing |
| 2 | BCL | Match with Field 1, Branch to Addr in Field 2 |
| 3 | BCH | Match with Field 1, Branch to Addr in Field 2 |
| 4 | XFR | Contents of one selected LSR location is transferred to selected register or selected input is gated to one selected LRS location |
| 5 | XFRH | See XFR above plus indexed addressing |
| 6 | BU | Branch to 12-bit ROS address in instruction word |
| 7 | 00 | Not used - illegal code |
| 8 | ORI | A OR'd with B, result stored in LSR 75 |
| 9 | ORM | A OR'd with B, result not stored |
| A | ADD | A plus B, sum stored in LSR 75 |
| B | ADDM | A plus B, sum not stored |
| C | AND | A ANDed with B, result to LSR 75 |
| D | ANDM | A ANDed with B, result not stored |
| E | XO | A Exclusive OR B, result to LSR 75 |
| F | XOM | A Exclusive OR B, result not stored |

Figure 2:
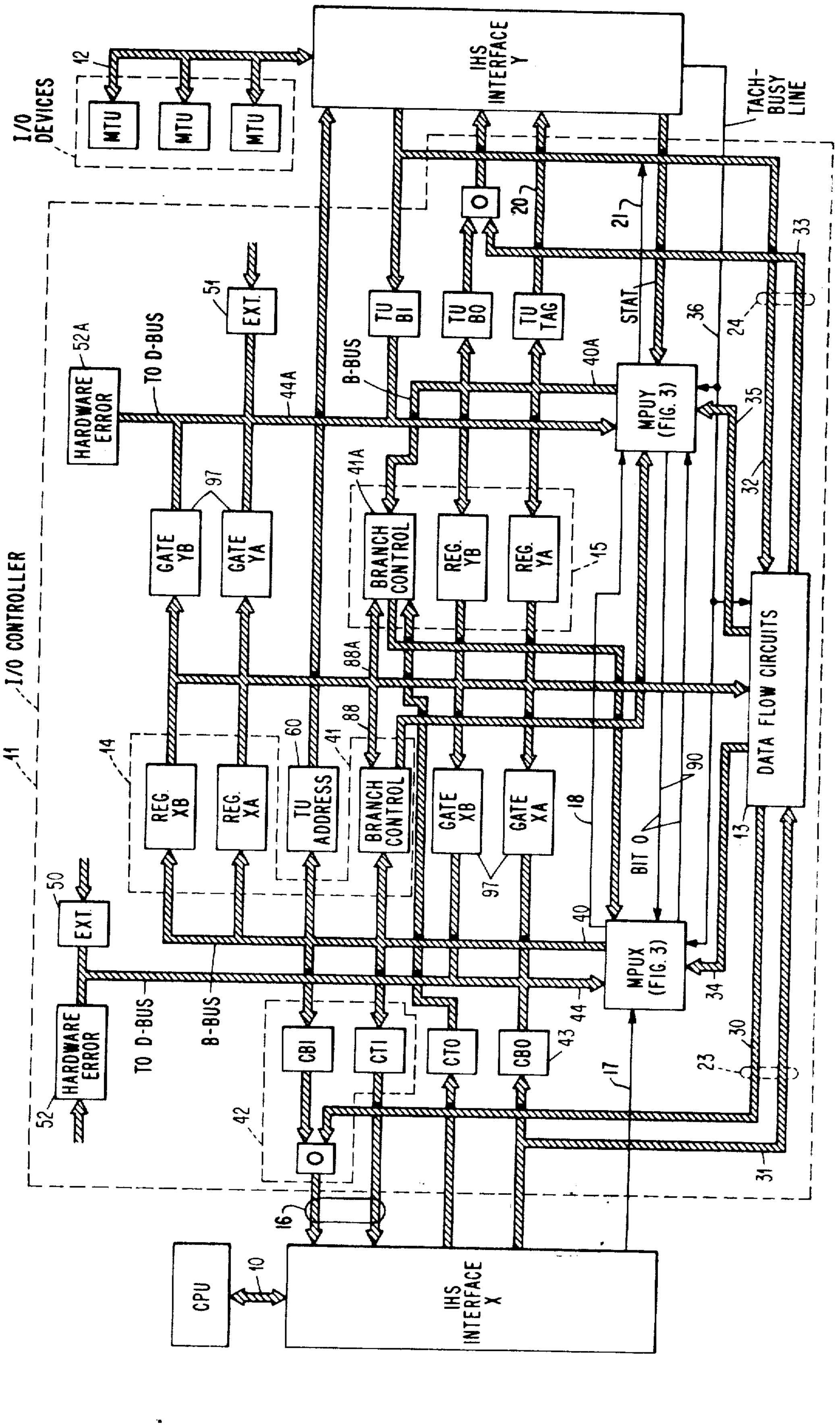
FIG. 2 is a simplified block diagram of a peripheral subsystem using the present invention.

In the above list, the letter "A" means A register 85, "B" is the B bus, and the mnemonics are for programming purposes. The term "selected input" indicates one of the hardware input gates (92, 94, 96, 98) to the ALU output bus 80. The term "selected register" indicates one of the "hardware" registers in MPU. These include the interconnect registers 14 and 15 (FIG. 2), tag register 74, bus register 99, address register 60, and IC 66. Note that transfers from LSR 75 to these selected registers are via B bus 73. In FIG. 2, the B bus for MPUX corresponds to cable 40, while the MPUY B bus is cable 40A. Registers 14 receive signals via AND circuits 86 and 87. In MPUY, AND circuits 86 and 87 supply signals to exchange registers 15. Branch control 79 in FIG. 3 is the internal branch control. Branch controls 41 and 41A of FIG. 2 supply their signals respectively over cables 88 and 87A to the respective MPU's. These branch controls are separate circuits. Tag register 74 in FIG. 3 for MPUX corresponds to CTI register in the channel exchange registers 42. For MPUY, it corresponds to TUTAG register connected to INTFY. In a similar manner, bus register 87 for MPUX is register CBI in channel exchanging registers 42, while in MPUY it is register TUBO (tape unit bus out). Address register 60 of FIG. 3 corresponds to TU address register 60 of FIG. 2. MPUY address register 60 is not used.

Status register 89 has several output connections from the respective MPU's. It is divided into a high- and low-order portion. The high-order portion has STAT (status) bits 0–3, while the low-order portion has STAT bit 0 plus STAT bits 4–7 (referred to as STAT A through STAT D, respectively). The low-order portion is supplied to the branch control 79 of the other MPU's. The bits 0 and 4–7 are supplied to the data flow. Bit 7 additionally is supplied directly to the ALU 72 of the other MPU's. The bits 0 and 4–7 are supplied to the data flow. Bit 7 additionally is supplied directly to the ALU 72 of the MPUY as indicated by lines 90 in FIG. 2. This corresponds to a self-trapping operation which will be later described. Interpretation of the STAT bits is microprogram determined.

The signal-receiving portions of each MPU are in four categories. First, bus register 91 is designed to receive tags and data bytes for MPUX—this corresponds to CBO register 43 of FIG. 2. An MPUY bus register 91 is TUBI (tape unit bus in) register. AND circuit 92 is responsive to the transfer decode signals from circuits 70 to selectively gate bus register 91 to D register 81. From thence, the data bytes are supplied to LSR 75. Secondly, D register 81 also receives inputs from hardware error register 93 via AND circuit 94. Hardware error signals (parity errors, etc.) are generated in circuit 95 in accordance with known techniques. Thirdly, AND circuit 96 receives external data signals over cable 97 for supplying same to D register 81 under microprogram control. Fourthly, interchange registers 14 and 15 respectively supply signals to pairs of AND circuits 98 which selectively gate the interchange signals to D register 81 under microprogram control. The receiving microprogram controls the reception of interchange signals from the other MPU.

Generally, the outgoing signals from each MPU are supplied via B bus 73, also a main input bus to ALU 72. The signal-receiving bus is the D bus, which is the input bus for LSR 75 and the output bus for ALU 72.

Since ALU 72 has a limited repertoire of operations, many of the operations preformed are simple transfer operations without arithmetic functions being performed. For example, for OP code 4, which is a transfer instruction, the contents of the addressed LSR are transferred to a selected register. This selected register may be A register 85 in addition to the output registers. To add two numbers together in ALU 72, a transfer is first made to A register 85. The next addressed LSR is supplied to the B bus and added to the A register contents with the result being stored in D register 81. At the completion of the ADD cycle, the contents or result of D register 81 is stored in LSR 75. If it is desired to output the results of the arithmetic operation, then another cycle is used to transfer the results from LSR 75 over B bus 73 to a selected output register such as one of the interchange registers or bus register 87.

In FIG. 3, the input to D register 81 is either cable 44 or 44A of FIG. 2. Hardware error circuit 95 and error register 93 of FIG. 3 correspond both to the hardware error circuits 52 and 52A of FIG. 2. External cables 97 receive signals from the external registers 50 and 51 respectively for the two MPU's.

AND circuits 98 of FIG. 3 correspond to the gates XA, XB, YA, and YB of FIG. 2.

Figure 5:
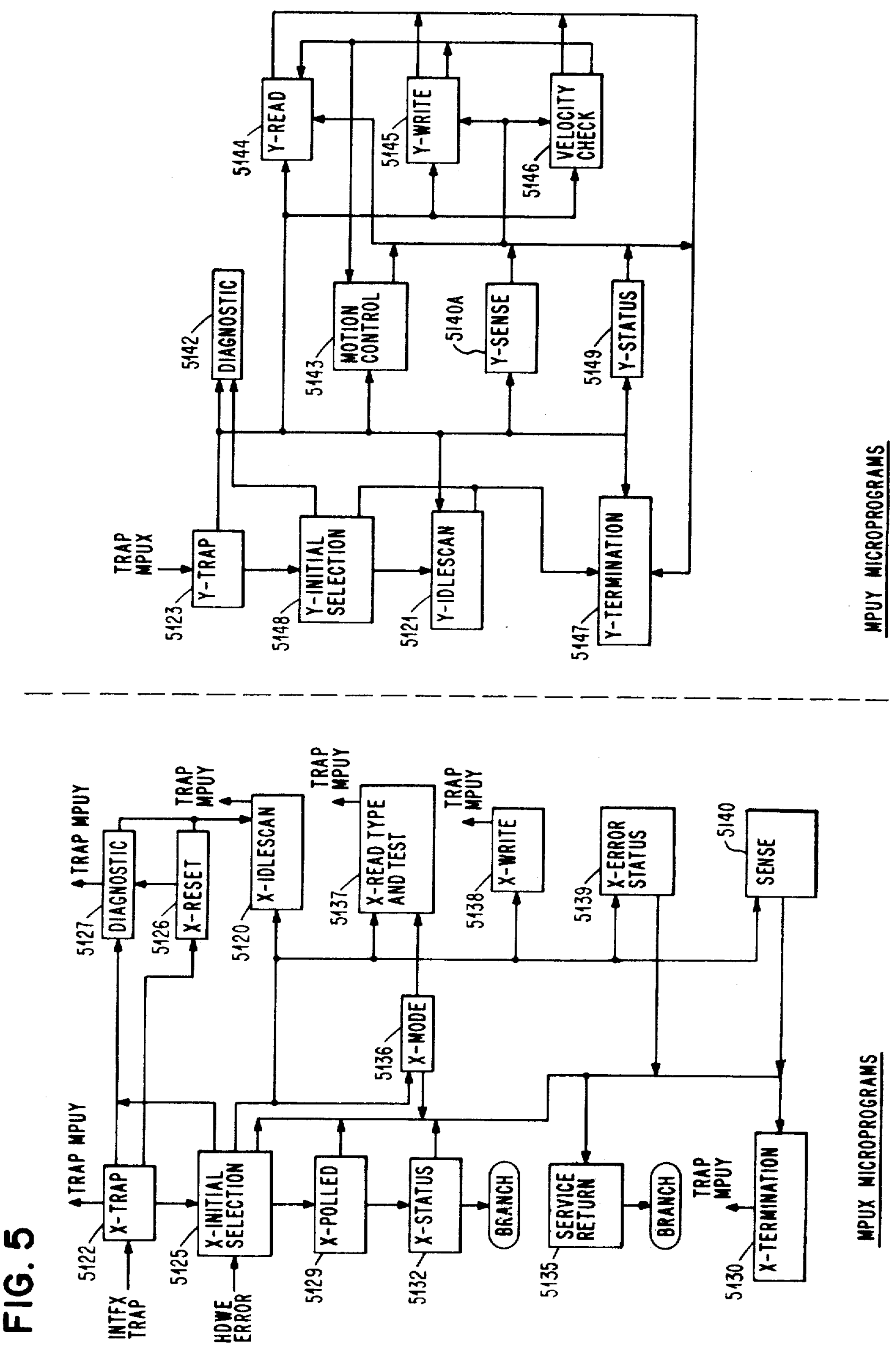
FIG. 5 is a simplified diagram of a set of programs in an I/O controller and with which the present invention may be used.

Each MPU is trapped to a predetermined routine by a signal on trap line 17 or 18, respectively. The trap signal forces IC 66 to all zeros. At ROS address 000, the instruction work initiates X-trap routine (FIG. 5) or Y-trap routine (FIG. 5). For reliability purposes, it is desirable to force MPUY to inactivity. This means that clock oscillator 98 is gated to an inactive state. During normal operations, clock 98 supplies timing pulses to advance IC 66 and coordinate operations of the various MPU's as is well known. Whenever MPUY has finished its operations, it sets stat D in register 89. Stat D indicated MPUY has finished its operations as requested by MPUX. The stat D signal sets hold latch 99A indicating that MPUY is inactive. Hold latch 99A gates clock 98 to the inactive condition. When MPUX traps MPUY, not only is IC 66 preset to all zeros, but hold latch 99A is reset. Clock 98 is then enabled for operating MPUY.

BRANCHING OPERATION

Figure 4:
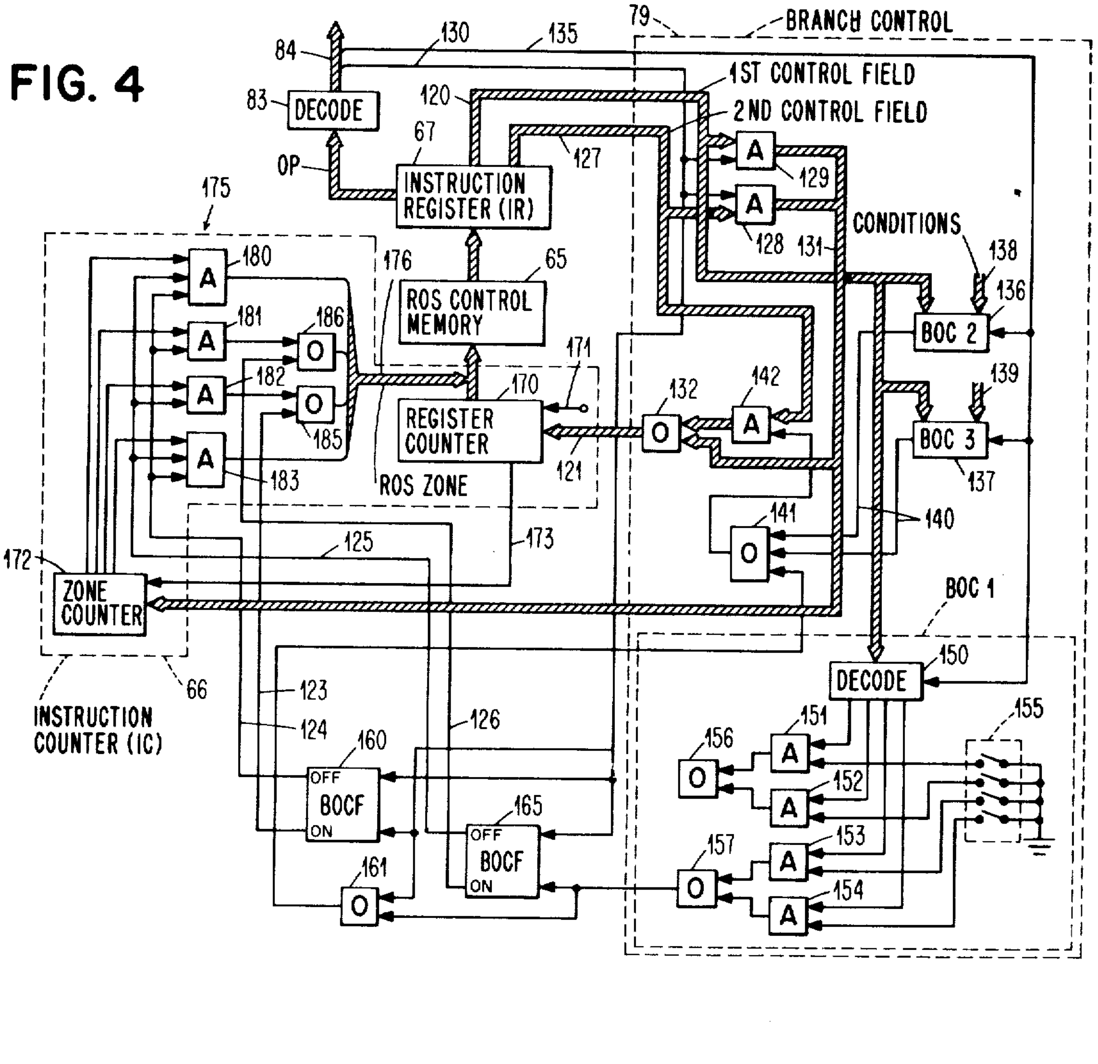
FIG. 4 is an abbreviated logic flow diagram of the branch control used in the FIG. 3 illustrated controller.

Referring now more particularly to FIG. 4, the branching operations performable by the described machine are further explained. Branch control 79 and instruction counter 66 are shown in somewhat greater detail in combination with the ROS control memory 65, IR 67, decoder 83, and several interconnecting cables. Branch control 79 responds to either the BU or BOC command signals from decoder 83 to translate signals representing the first control field supplied over cable 120 from IR 67. Based upon conditions supplied to branch control 79 from other portions of the machine, IC 66 receives a set of address signals over cable 121 for a certain set of branching and over cables 121 and 122 for a second type of branching operation. Additionally, signals over control lines 123, 124, 125, and 126 alter the branching operations in accordance with the conditions on which branched.

Branch control 79 responds to the branch unconditional (BU) command signal resulting from decoding OP code 6, as set forth in the instruction word list, to transfer the first and second control fields received over cables 120 and 127 to instruction counter 66. In this regard, branch control 79 has a pair of sets of AND circuits 128 and 129 which not only receive the signals representing the first and second control fields, but also the BU command signal over line 130. The outputs of these AND circuits are supplied over cable 131 to OR circuits 132 for selecting a register within a zone, as will be later described. Cable 131 is connected to a second portion of IC 66, as later described, for selecting the zone in which the address register resides in ROS 65. In this regard, the second control field is passed to select the register within a zone while all or a portion of the first control fields are passed by AND circuits 128 to select the memory zone. In this manner, by combining both the first and second control fields, any register within all zones of memory in ROS 65 are addressed.

The illustrated machine has two branch on conditions—BCL and BCH, respectively corresponding to OP codes 2 and 3. For purposes of discussion, BCL provides those branch on conditions (BOC) for branching within a zone of ROS 65, as explained with respect to FIG. 1. BCH selects those branch on conditions which are based upon operational capability of the machine and in which the condition on which the branch is based selects the zone of memory from which the next instruction word is fetched. We will first describe BCL. The command signals supplied over BOC lines (one line for BCL and one for BCH) are supplied to branch on condition circuits 136 and 137. These circuits respond to the BCL command signal to test for BOC. Circuits 136 and 137 also receive the first control field over cable 120. These circuits decode the first control field whenever activated by the BCL signal on lines 135. The code permutations in the first control field are compared with a set of conditions applied to these circuits over cables 138 and 139, respectively, from hardware latches/registers within the machine. These are not shown for clarity, but such conditions on which the branch may be based, is a carry-out of ALU 72, any of the bus registers 91 or 99, the tag registers 74, status register 89, address register 60, hardware error register 93, and the like. Branching may also be provided on errors such as may be provided in address check circuit 76, etc. If the code permutations in the first control field match with the conditions indicating the branch, an activating signal supplied by the respective branch on condition circuits over control lines 140 through OR circuit 141 activate AND circuit 142, AND circuit 142 passes signals representing the second control field supplied over cable 127 through OR circuits 132 to IC 66 for effecting the branch. If the conditions do not match with the permutations in the first control field, AND circuits 142 remain closed such that the next instruction word is fetched in accordance with the counting procedure of IC 66, as is well known. The above-described branching enables the machine to select from a plurality of microprograms within one zone of ROS 65.

The branching between zones based upon a BOC instruction, such as BCH, is described. Circuit BOC 1 effects branching on condition between zones in response to BCH command signals received over lines 135 and the first control field received over cable 120. Decoder 150 is activated by the appropriate control signals on lines 135 to decode the first control field received over cable 120. Not all code permutations need be decoded. As shown for BOC-1 four possible combinations are decoded. Two of each combination referred to the same feature and therefore branch to the same zone of memory. The outputs of decoder 150 are supplied to four AND circuits 151, 152, 153, and 154. These AND circuits are respectively cojointly activated by the decoder 150 output signals and an enabling signal from one of the sets of switches 155 which are closed whenever a feature corresponding to the code permutations of the first control field is installed in the machine. The output of these AND circuits are supplied through OR circuits 156 and 157 which then activate circuits for transferring address signals to IC 66.

The first branch on condition feature (BOCF) is activated from the output of OR circuit 156. This output sets BOCF latch 160 to its active condition as well as being supplied through OR circuit 161 to activate AND circuits 142. AND circuits 142 pass the second control field code to IC 66 for selecting the register within a zone of memory which is to be addressed. BOCF latch 160 has activating output line 123 activating later-described circuits in IC 66 for forcing the selection of zone 2 of ROS 65. Output line 124 carries signals to IC 66 for informing it that no BOCF is to be performed.

BOCF latch 160 remains in the active condition until feature program 106 (FIG. 1) has been completed or until a BU operation is performed, even within feature program 106. Such a branch operation loads zone counter 172 in accordance with the branch instruction permitting BOCF latches to be reset. In other words, any branch operation defining a complete ROS address should reset the BOCF latches. It will be remembered that the feature program exits to another zone over line 108 by a BU instruction. As seen in FIG. 4, the BU command signal on line 130 also resets BOCF latch 160 returning the control of the zone selection in ROS 65 to IC 66. A BU instruction within memory zone 2 will also reset BOCF latch 160. A second feature selection for feature B is enabled in the same manner via lines 124 and 125 by BOCF latch 165 which is set to the active condition by the output signal of OR circuit 157. Again, latch 165 is reset to the inactive condition by a BU command signal on line 130.

IC 66 includes zone instruction counter 170 which has a modulus equal to the modulus of the second control field. It may be preset in a known manner by the signals received over cable 121 for effecting a branch operation. Otherwise, zone instruction counter 170 is advanced one count for each machine cycle of the illustrated machine. This is the usual known mode of operation and is not further described for that reason. The advancing pulses may be received over line 171 from clock 48 of FIG. 3.

Once each instruction, zone counter 172 selects the zone of ROS 65 which is addressed. A subsequent clock pulse on line 172A activiates AND circuits 169 to transfer IC 66 signals to ROS 65 for fetching the next instruction word. Such serially activating or sequencing clock pulses are so well known that any electronic machine designer could easily set up the clock sequence circuits. However, the IC count need not be gated to ROS 65. Gating out ROS 65 to IR 67 during the ending portion of a machine cycle permits either the IC count or the branch address in IC 66 to be used as the ROS address.

The carry-out of zone instruction counter 170 may be supplied over line 173 such that a single program of instructions may extend beyond one zone without a BU instruction being required. No requirement is necessary for this, and zone counter 172 actually may be a register without counting capabilities. Zone counter 172 is preset to any desired condition by signals received over cable 122 as explained earlier for the BU instruction. The output signals of zone counter 172 are supplied through a logic net 175, thence over cable 176 to select the appropriate zone in ROS 65. The zone control within a memory, either ROS or electrically alterable, is well known and not further described.

Logic net 175 consists of a set of four AND circuits 180, 181, 182, and 183 which are used to gate signals from zone counter 172 whenever a BOCF is not in effect. The off-indicating signals from BOCF latches 160 and 165 are respectively supplied over lines 124 and 125 to enable AND circuits as shown for passing the zone counter 172 signals to cable 176. When either of the BOCF latches 160 or 165 are on, and only one can be on at a given time, AND circuits 180–183 are disabled to pass no signals (yielding 0's for address bits) with the zone being selected by the BOCF latch. BOCF latch 160 supplies its zone selecting or activating signal over line 123 through OR circuit 185 to select zone 2 of ROS 65. Since the AND circuits 180–183 are disabled in the absence of an "indicating signal" by arbitrary definition, 0's are effectively transmitted to the other digit positions. In a similar manner, BOCF latch 165 supplies its zone selecting or activating signal over line 126 through OR circuit 186 to select zone 3. Whenever BOCF latches 160 and 165 are not supplying their respective activating signals on lines 123 or 126, the signals on lines 124 and 125 jointly enable AND circuits 180 and 183 to transfer counter 172 signals to ROS 65. An interlocking means may be provided such that latches 160 and 165 can not be both set to the active condition at a given time. This is not shown for simplifying the presentation.

From inspection of FIG. 4, it is seen that the hardware differences between a BOCF instruction execution and a BOC instruction execution, limited to a given zone of ROS 65 resides in the BOCF latches and their associated controlling logic circuits plus logic net 175 in IC 66. This very small number of logic circuits required to add a significant functional advantage to the machine provides a significant economic advantage in practicing the present invention.

Circuits BOC 2 and 3 may be constructed in accordance with the showing of circuit BOC 1. Decoder 150 may be any type of decoder known in the data processing arts and not pertinent to the practice of this invention.

MICROPROGRAMMING GENERALLY

FIG. 5 shows general relationships between the micro-routines of MPUX and MPUY. This showing is greatly simplified to give a general impression of how the micro-routines cooperate to perform I/O controller functions. Many of the functions performed by these micro-routines have been performed before in other I/O controllers, usually by hardware sequences. Correlation of selected microprogram routines with previous hardware routines are set forth in some of the detailed description following this section. Some micro-routines of lesser importance to the present invention have been omitted for clarity. The described routines were selected to illustrate the operating relationship of MPUX, MPUY, and data flow circuits 13.

X idlescan 5120 and Y idlescan 5121 monitor pending status, interrupt status, and provide intercommunication between the two MPU's for ascertaining the availability of devices connected to INTFY. X idlescan 5120 includes trapping MPUY via Y idlescan 5121 for polling INTFY to determine availability of an MTU addressed by INTFX. Included in X idlescan is a wait routine which idles MPUX until trapped by INTFX. INTFX traps MPUX to ROS 65 address 000. An MPUX ROS address 000, X-trap 5122 begins. During the execution of X-trap routine 5122, MPUY is trapped to ROS address 0000 to later execute Y-trap routine 5123. In X-trap 5,22, CTO is sensed for initial selection. If the initial selection tag is active, X-trap routine branches the microprogram to X-initial selection 5125. If there is no initial selection, then either X-reset 5126 or an ALU diagnostic within diagnostic 5127 is performed. Upon completion of these functions, X idlescan 5120 may be re-entered to complete MTU scanning operations. Initial selection 5125 is responsive to certain hardware errors received over line 5128 (sensed as described with respect to FIG. 3) to stop I/O controller 11 for indicating detected hardware errors. A primary function of initial selection 5125 is interrupt processing, as described later with respect to FIG. 5.

During an initial selection, X-polled 5129 is entered to further identify the INTFX request. Also, certain branch conditions are set up in LSR for use later by X-termination 5130. MTU address verification may be performed. Upon completion of the branch setups, the X-polled 5129 initiates X-status 5132. X-status 5132 activates CTI to send tag signals to INTFX indicating controller status in response to the previously received INTFX request. Based upon the branching set up in X-polled 5129, the microprogram execution may follow several routes. These primarily end up in X-termination 5130 which terminates the MPUX operation. MPUX then scans for further interrupts. With all scanning completed, MPUX waits for further instructions from INTFX.

Another important routine is service return (SERVRTN) 135 used in conjunction with INTFX for timing and control purposes during data transfers. The operation of the above-referred-to data channel operation in Moyer et al. is implemented by service return 5135. Another possible routine entered from initial selection 5125 is X mode 5136, which determines the mode of operation in the controller in response to INTFX CMDO (Command Out) signals. X-read type and test 5137 is entered in the event the initial selection results in a read operation. X-read type and test 5137 traps MPUY to predetermined addresses, as later explained, for initializing a read operation in MPUY. In a similar manner, X-write 5138 is entered and also traps MPUY to another subroutine for initializing a write operation. Error status 5139 transfers error information through INTFX to CPU. This routine is closely associated with initializing I/O controller 11 for read or write. Sense 5140 and 5140A are entered in response to a sense command. Sensing transfers sense bytes to CPU for analysis. X-termination 5130 also traps MPUY in connection with the selecting activated MTU's and for performing other functions in connection with terminating an operation previously initiated through INTFX as will be described. MPUY micro-routines respond to MPUX micro-routines for controlling various MTU's via INTFY. These micro-routines also transfer information control signals from INTFY to MPUX for retransmittal to INTFX. Upon being trapped by MPUX, Y-trap 5123 obtains an MPUY ROS address from XB register and then branches to that address. Such ROS addresses are the first instruction address of several MPUY microprograms. For example, one address initiates diagnostic 5142. Diagnostic 5142 initiates motion control activity in motion control 5143, reading activity in Y-read 5144, writing activity in Y-write 5145, velocity analysis in velocity 5146, or termination in Y-termination 5147. Diagnostic 5142 may also perform internal diagnostic functions such as ALU operation checking. On the other hand, Y-trap routine 5123 may branch to Y-initial selection 5148 to initialize MPUY for activity set forth in additional control signals from MPUX in registers 14. This may include an initiation of status 5149, termination 5147, or Y-idlescan 5121. The MTU operating routines 5143–5146 may also be initiated from initial selection 5148. As will become apparent, in addition to exchanging control signals via registers 14 and 15, status information is freely exchanged between the two MPU's for microprogram coordination.

In the following detailed description, the idlescan routines are first discussed in detail. This discussion shows some of the interrelationships between the two MPU's and the micro-routines. It is also useful to show how control information is transferred from MPUX via registers 14 to MPUY, as well as exchange of status information via status registers in MPU's.

BOCF IN Y-READ 5144

Figures 6, 7:
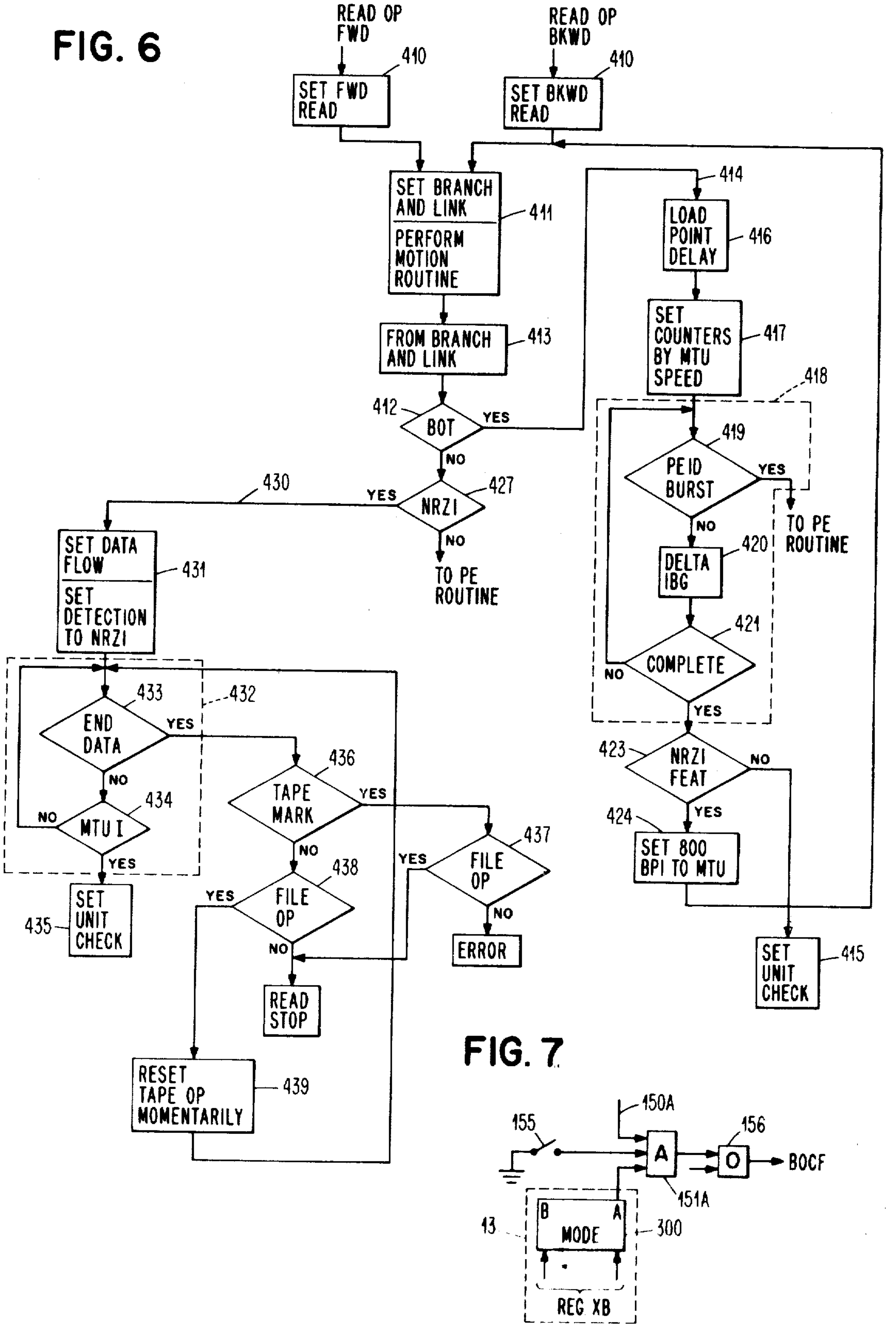
FIG. 6 is a simplified program flow chart illustrating one application of the present invention.
FIG. 7 is a simplified logic diagram showing a variation of a branch control.

Application of BOCF or extended branch on conditions is described with respect to a simplified showing of the Y-read microprogram shown and described generally with respect to FIG. 6. The two program entries into Y-read 5144 are from READ OP FORWARD and READ OP BACKWARD. The first steps in these two entries are to set the selected or addressed MTU in a known manner to read forward or backward as shown in steps 410. After the MTU's have been set to the proper mode, the program sets a branch and link register and performs a motion routine in subroutine 411. Branch and link operation comprises setting a specified register in LSR 75 to a ROS 65 address for performing step 412 after completion of the motion routine. The last instruction in the motion routine is a BU instruction which fetches the address of the next instruction from the specified LSR 75 register as shown in step 413.

The motion routine performed in subroutine 411 effects all tape motions for the addressed MTU. Commands are exchanged between MPUY and the addressed MTU during such motion control program for carrying out motions preliminary to a data processing operation and during the data processing operation, read or write, diagnostics for positioning tape in response to a command received from the controlling data processing system or CPU. In this motion control microprogram, command signals are program generated; and the MTU not only is set to read forward or backward, but also to perform a series of motions necessary to have the magnetic media at operating velocity at the proper time. This may include a hitch operation; that is, in a read forward, the tape may be positioned with respect to the reading transducer such that the tape cannot be accelerated to proper velocity before the transducer reaches the data to be read. In such a situation, the tape is first moved backward a given amount and then moved forward for attaining the proper velocity. Motion routine 411 supervises the addressed MTU in performing such operations. Included in these is a sensing of the last-performed operation by the addressed MTU. This determines what type of preliminary operations are required. Upon completion of the motion routine, decision step 412 determines whether or not the tape in the addressed MTU is at beginning of tape (BOT). That is, at BOT no data processing operations have been performed on the tape in the MTU; and the tape must now be positioned for subsequent data processing operation. In this regard, the program exits over line 414 to load point delay 416. This delay is determined by the tape velocity and the known distance the tape has to move to reach the first block of data signals recorded on the tape from load point. Load point is the reference point on the tape at which all motion operations are performed. Counters, i.e., program counters, are set in step 417. For example, the I/O controller may operate with several MTU's having different tape velocities such as 50 inches per second (ips), 75 ips, 125 ips, 200 ips, etc. Then, the microprogram performs a count in accordance with the counters in steps 418. At this time, the microprogram in step 419 senses hardware detection circuits for the PEID burst which indicates that the tape in the MTU has been recorded in the PE (phase-encoded) recording format. As soon as this is detected, the program exits to a PE read routine which is not described and is beyond the scope of the present specification. So long as the PEID burst is not detected, the counters are altered in step 420 for metering the tape from load point. In decision step 421, the microprogram determines whether or not sufficient tape has been metered. If not, the routine is reperformed. Upon completing metering tape and no PEID burst has been detected, it is assumed that all the recording format on the tape is standard NRZI.

In the described I/O controller, the design is such that it normally works with PE recording. Therefore, the PE routine for reading from tape resides either in zone 1 memory or zone 2 memory as a base program 100 or an additional program 103. However, many recording systems use NRZI. Therefore, to increase the flexibility of the I/O controller, a NRZI feature may be added to the basic program. In the illustrated embodiment, the feature A programs 106 are those programs necessary for I/O controller 11 to operate with NRZI recording on a tape in an addressed MTU. Therefore, to branch to a NRZI routine, a BOCF instruction is executed. Such BOCF is performed in step 423 of FIG. 6 and as described as with respect to FIG. 4. If the feature is not in the machine, then the branch is not executed; and the next instruction fetched by incrementing IC 66 causes the I/O controller to execute step 415 which sends unit check signal to CPU telling it that it cannot perform a read on the tape in the addressed MTU. This type of programming is not germane to the practicing of the present invention and is not further described for that reason.

Assume now that the NRZI feature has been installed as indicated by closing the appropriate switch 155; then, in step 424, a command signal is generated by the microprogram causing the addressed MTU to set to 800 bpi. This means that the NRZI recording is at 800 bits per inch. The addressed MTU then has electronic circuits necessary for detecting and transferring NRZI signals from tape to the I/O controller in the usual manner. The program then reenters routine 411. During the second pass through routines 411, 413, and 412, the addressed MTU already has moved its tape, ready for a read operation. Therefore, the microprogram exits step 412 to decision step 427. This decision step 427 checks the appropriate LSR 75 register for detecting whether or not NRZI or PE operation is to be performed. If the PEID burst was detected in step 419, then the PE routine (not described nor shown) sets an indicator in the appropriate LSR 75 register indicating that the record is in PE format. This is equivalent to being "not NRZI" such that the microprogram then enters a PE routine. On the other hand, if it is NRZI, then the program exits over line 430 to set the data flow circuits 13 in step 431. What this action does is to activate the NRZI detector in data flow circuits 13. In addition, data flow circuits 13 have a PE detector which is set or activated by the PE routine. After setting the detection to NRZI, a wait loop is entered for permitting the data flow circuits 13 to process all NRZI data to be read from the first block of recorded data signals. In this regard, loop 432 merely senses for end of data in step 433 and MTU interrupt in step 434. Without end of data and with no interrupt from the addressed MTU, the microprogram merely cycles between these two steps. If the selected MTU has an interrupt, then the read cannot be completed; and unit check is set in 435 with the microprogram exiting (branching) to Y-termination routine 147. These latter branches can be BOCF or BU types. The BU branch is preceded by a first type BOC.

Normally, end of data is detected in step 433. The program then exits (branches) to perform step 436 to determine whether or not the signals read were a tape mark. If it is a tape mark, then the microprogram must check to see whether or not the command from the CPU is a file operation. If not, there is an error. If it is a file operation, then read stop routine (not described) is entered. If it is not a tape mark, which is normal for a data readback operation, decision step 438 determines whether or not it is a file operation. If not, read stop is also entered. If it is a file operation, then in step 439 the program resets the tape operation indicator momentarily for reclearing certain indicators not pertinent to the practice of the present invention. It then re-enters wait loop 432 such that a subsequent block of data may be successfully read.

The above-described BOCF branch is based upon whether or not an operational feature or capability was installed in the machine. In a multi-mode machine, such as an I/O controller operable in either a PE or NRZI mode, additional microprogram efficiency can be attained by making BOCF dependent on both modes set in the machine and the capability being present. In FIG. 7, BOCF line from OR circuit 156 is as shown in FIG. 4. AND circuit 151A is a modified AND circuit 151 to be jointly responsive to the "feature present" signal from a switch 155 and branch decode signal on line 150A from decoder 150 (FIG. 4), plus the added input "mode set" signal from additional mode latch 300 in data flow circuits 13. If mode A (NRZI) is set in latch 300, BOCF is permitted. If I/O controller 11 is not in mode A, the branch is inhibited enabling the MPUX microprogram to proceed for mode setting or error determination upon a mode set, and latch 300 is set to made A and BOCF executed.

Latch 300 can be set/reset by various techniques. In prior I/O controllers, such as IBM Model 2803 Tape Control Unit, the CU was responsive to PEID for setting PE mode (mode B herein) and absence of PEID to set NRZI mode (mode A herein) in its data flow circuits. Those techniques may be used to set/reset latch 300. In another manner, MPUY microprograms can sense mode status in addressed MTU. The MTU's still respond to PEID or its absence for determining read mode. MPUY microprograms can load YB for controlling data flow circuits 13 as described in the Irwin copending application. Also, the mode status may be set up by CPU into MPUX. MPUX can load XB for transferring mode to MPUY or data flow circuits can be responsive to XB to select mode. In any event, a plurality of design choices for controlling latch 300 are readily available; and the particular technique chosen does not affect successful practice of this invention. Of course, mode status may be kept in LSR as well.

While the invention has been particularly shown and described with reference to preferred embodiments thereof, it will be understood by those skilled in the art that various changes in form and details may be made therein without departing from the spirit and scope of the invention.

What is claimed is:

1. A program control for a digital machine operating with a set of instruction words having at least an operation code field, first and second control fields, said second control field having a modulus capable of addressing a given-sized memory zone, said digital machine having a memory with a plurality of said memory zones, first branch instruction words for addressing any of said zones by combining the second control field with another field to form a complete memory address and second branch instruction words capable of addressing within one of said zones by using said second control field as a memory address, the improvement including the combination:

branch control means responsive to one of said fields in said second type of instruction for selecting a branch on condition, said branches on condition being in first and second categories, branching within said first category being limited to any address containable in said second control field, thereby limiting branching to a given memory zone, and circuit means in said branch control means responsive to predetermined ones of said branches on condition in said second category to select one of said memory zones in accordance with the condition being branched upon and modifying accessing said memory in accordance therewith.

2. The control set forth in claim 1 wherein the first category relates to operations performed in the machine and said second category of conditions relates to operational capability of the machine.

3. The control set forth in claim 2 wherein all instruction words relating to a given operational capability are lodged in one zone of said memory whereby said circuit means is responsive to said second category conditions in an identical manner for each given operational capability.

4. The control set forth in claim 3 wherein the digital machine is an I/O controller operable with peripheral devices having differing operational capabilities, said machine having a first set of instruction words arranged in one or more zones of said memory to operate with at least a first one of said operational capabilities and including a plurality of said second branch instruction words of the second category type, capability indicating means in said machine for inhibiting branching on said second category conditions, means adding a zone of memory containing a second set of instruction words arranged to be operative with a second operational capability, but incapable of independently operating said devices, said second branch instruction being interspersed in said first set to segment machine operation in a manner that said second set is substituted for portions of said first set signifying the differences of said first and second sets, and means preventing operation of said capability indicating means.

5. The control set forth in claim 4 wherein said first and second operational capabilities are manifested in said machine by first and second special circuit means, each said special circuit means being independently operative in different manners with said devices, multistable state means for indicating at least first and second operational modes, said special circuit means responsive to said multistable state means to be either operational or not in accordance with said mode, and circuit means operative with said devices for detecting first and second operations corresponding to said operational capabilities, respectively, and setting said multistable state means in accordance therewith only if said capability indicating means indicates such capability.

6. The control set forth in claim 5 wherein said operational capabilities are magnetic recording/reproducing capabilities in first and second digital recording schemes, respectively, and said special circuit means being recording or detection circuits for operating with such digital recording schemes and being responsive to said multistable state means for selecting the appropriate operation.

7. The control set forth in claim 1 further including multistable memory means in said circuit means to maintain said zone selection subsequent to execution of one of said second branches of the second category.

8. The control set forth in claim 7 further including reset means in said circuit means operative to reset said multistable memory means in accordance with code permutations in an instruction word fetched subsequent to said one second branches of the second category.

9. The control set forth in claim 8 wherein said reset means is responsive to said subsequent instruction word only when such instruction word indicates a branching operation identifying a zone of memory.

10. The control set forth in claim 6 wherein said branch control effecting said second branch operation of said second category is further operative to determine said branch only when said multistable state means is set to a mode corresponding to such operational capability relating to said mode to effect said branch operation.

11. A programmable machine operable with an instruction word having at least an operation code field, first and second control fields, said second control field capable of addressing a predetermined zone of memory in said programmable machine, branch control means responsive to said code permutations in one of said fields for selecting program branches in accordance with conditions established in said machine, said programmable machine capable of performing predetermined functions and alterable to perform additional functions, means in said branch control means responsive to modification of said programmable machine to perform said additional functions for supplying a signal indicative that additional functions may be performed, and memory addressing means jointly responsive to said branch control means condition and to said second field for selecting programs in said memory outside the addressable scope of said second field and pointed to programs dedicated to performing said additional functions.

12. A programmable machine wherein each instruction includes operation code, first, and second control fields, means in said machine for sequencing sets of instructions in accordance with a predetermined pattern and including branch operations based upon conditions set forth in said first field to branch to memory addresses in accordance with code permutations in said second field, branch control means responsive to conditions established in said machine by instructions executed prior to a given branch instruction for making a comparison with code permutations in said first field for effecting a branch or not in accordance with the code permutations in said second field or in accordance with another predetermined sequence of instructions, additional means in said programmable machine insertable therein for performing additional functions not necessarily initially performable by said programmable machine and means in said branch control means for indicating such additional functions, and circuit means responsive to said branch control means making a predetermined comparison with code permutations in said first control field and in accordance with said installation of said additional functions for effecting a branch operation to a portion of memory dedicated to performance of said additional functions outside the addressing capability of said second field and said branch control means operable in the absence of such additional functions to prevent said program of instructions from branching in such manner.

13. The method of manufacturing and extending the programmable capability of a programmable digital machine including the following steps:

initially manufacturing and programming said machine to perform predetermined functions, said program of instructions including branch instructions at selected points therein, some of said branch instructions including branching operations on selected operational conditions and other branch on condition instructions on operational capability conditions, inserting either in the field or in the factory said operational capability conditions when additional functions are to be performed by said machine and storing in said machine a set of program steps relatable to said additional operational capabilities and branchable thereto by said branch on condition on said operational capability conditions and returning to said first program of instructions upon completion of such additional functions, and providing hardware means in said machine responsive to said conditions of operational capability for altering a memory address in said machine such that said additional programs are referred to rather than said first set of programs.

14. The method of operating a programmable machine having plural memory zones for containing instruction words, each instruction word having an operation code and first and second control fields, one of said control fields having a modulus for addressing not more than all registers in any one of said zones, with branch on conditions being limited to such zone, the method including the steps of:

analyzing all branch on condition instruction words to ascertain predetermined conditions on which instruction stream branching is to occur, then branching to a register designated by said one control field within the same zone from which the present instruction word was fetched on said predetermined branching conditions, and for branch on conditions other than said predetermined conditions selecting a zone other than said same zone based on said other branch on condition, and further branching from zone to zone by combining said control fields to designate a memory register including a zone designation.

15. The method set forth in claim 14, further selecting a register in said other zone in accordance with said one control field.

16. The method set forth in claim 14, further ascertaining that said predetermined conditions relate to functions machine operations and said other conditions relate to conditions indicating status not affected by machine operation.

17. The method set forth in claim 14 further including lodging a first set of programs in one or more of said zones by using said combined control fields in all interzone branching, lodging a second program in another zone, and inserting conditions for branching at selected points of said first set of programs for branching to said second program whereby some functions performed in said first set of programs are not performed and other functions substituted therefor.

18. A programmable machine which operates in response to a set of instruction words which designate functions to be performed and may contain one or more control code permutations, some of said instruction words designating a conditional branch machine operation from one program to another program, first branch control means responsive to a first conditional branch instruction to indicate a branch in machine operation to any one of a set of programs designated by a first of said other code permutations in accordance with conditions specified by a second permutation, second branch control means responsive to a second conditional branch instruction to indicate a branch in machine operation to any one of another set of programs cojointly designated by said first code permutations and the condition on which branch is made, third branch control means responsive to a branch unconditional instruction to indicate a branch in machine operation to any one of a set of programs designated cojointly on said first code permutations plus an additional code permutation, and fourth means responsive to said branch control means to branch machine operation in accordance with said branch determinations.

19. The machine set forth in claim 18 wherein said machine exhibits expandability in the number of different operations which can be program controlled, means indicating whether or not an expanded capability is in the machine, programs related to such expanded capability limited to a selected zone of memory, and said second branch control means being responsive to said expanded capability indication to indicate a branching operation to said selected zone by modifying said first code permutation in a preset manner in accordance with the address indication of said selected zone.

20. The machine set forth in claim 18 further including memory means in said second branch control memorizing successful conditional branch determinations made therein, said fourth means being responsive to said memorized branch determinations to select a given zone of memory from which to branch machine operations, and fifth means responsive to machine operations subsequent to said branch determination to reset said memory means, thereby deselecting said zone selection as based on said branch determination.

21. The machine set forth in claim 20 wherein said fourth means has memory zone selecting means, gating means responsive to said memory means for selectively degating said zone selecting means from affecting machine operation and substituting another zone selection in accordance with said memory means and operative when said memory means is reset to gate said zone selecting means for affecting machine operation.

22. The machine set forth in claim 18 having first and second modes of operation corresponding to first and second operational capabilities, respectively, mode means indicating which mode of operation the machine can presently operate in, and said second branch control means being further responsive to said mode means for determining whether or not to branch to said one of another set of programs.

23. The method of extending the programmable capability of a digital machine, including the following steps in combination:

taking a manufactured and read-only store programmed machine which performs predetermined functions with the program of instructions including branch instructions at selected points therein, some of said branch instructions including branching operations on selected operational conditions and other branch-on-condition instructions on operational capability conditions indicated by hardware means;

predetermining additional functions to be performed by same machine;

inserting in said machine a set of read-only store program steps relatable to said additional functions to be performed;

relating such additional programs to said other branch-on-condition instructions; and relating such added programming to said hardware means associated with said other branch-on-condition instructions.

24. A programmable machine operable with an instruction word having at least an operation code field, first and second control fields, said second control field capable of addressing a predetermined zone of memory in said programmable machine, the improvement including in combination:

branch control means responsive to said code permutations in one of said fields for selecting program branches in accordance with conditions established in said machine;

means in said branch control means responsive to operational capability indications in said programmable machine to select a zone of memory in accordance with said indications in selected ones of said program branches;

memory addressing means jointly responsive to said branch control means condition and to said second field for selecting a program address register in said memory in a zone other than that from which the present instruction was fetched; and means in said machine indicating operational capability.

* * * * *